J. THOMAS.

Apparatus for Opening and Closing Blast-Furnace Tops.

No. 8,751. Reissued June 10, 1879.

*Attest:*

Joseph H. Gallagher
W. W. Wright

James Thomas,
By Francis D. Pastorius
*Attorney.*

UNITED STATES PATENT OFFICE.

JAMES THOMAS, OF OXMOOR, ALABAMA.

IMPROVEMENT IN APPARATUS FOR OPENING AND CLOSING BLAST-FURNACE TOPS.

Specification forming part of Letters Patent No. 103,391, dated May 24, 1870; Reissue No. 8,751, dated June 10, 1879; application filed November 5, 1878.

*To all whom it may concern:*

Be it known that I, JAMES THOMAS, of Oxmoor, in the county of Jefferson and State of Alabama, late of Parryville, in the county of Carbon and State of Pennsylvania, have invented a new and useful Improvement in Blast-Furnaces, which improvement is fully set forth in the following specification and accompanying drawings, in which—

Figure 1:
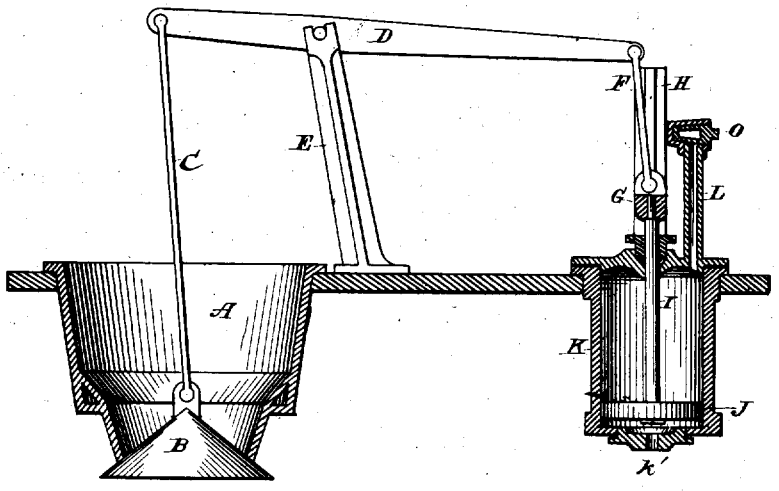
Figure 2:
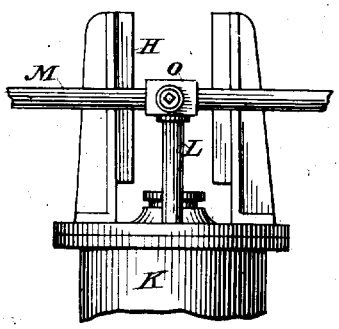

Figure 1 is a vertical longitudinal section of mechanism fitted to carry my invention into operation; and Fig. 2 is a detail view of the upper part of the cylinder of said mechanism and its attachments.

The object of my invention is to furnish an apparatus for automatically raising and lowering the bell which closes the top of the furnace and distributes the stock, so that it will be raised to close the furnace when the pressure of the blast is on and be lowereed when the pressure of the blast is off, thus guarding against danger from explosion when the blast is off the furnace.

The invention consists in combining with the charging-bell which closes the mouth of a blast-furnace a cylinder and piston connected to said bell, and operating the same by the agency of steam, air, or water, as hereinafter more particularly described.

A is the mouth of a blast-furnace, and B is a bell or valve for closing it when the blast is on, and for opening it and distributing the stock when the blast is shut off. It is suspended by a cord or swinging rod, C, attached to one end of a lever, D, which turns on a fulcrum or post, E. F is a connecting-rod between one end of the lever D and a cross-head, G, moving in guides H. I is a piston-rod, which passes through a stuffing-box, and attaches to a piston, J, of a cylinder, K.

An opening, *k'*, is formed in the lower cylinder-head, through which the air in the lower part of the cylinder K may pass in and out freely as the piston moves up and down.

A pipe, L, projecting from one cylinder-head, connects with a pipe, M, and a suitable cock, O.

When the blast from the furnace-engine is used for moving the piston J the pipe M can be connected with the blast-pipe between the furnace stop-valve and the furnace, so that if the blast is on the furnace its pressure will lower the piston, and of consequence raise and hold the bell closed. On the blast being shut off, the weight of the bell will cause it to lower and raise the piston, by which stock can be fed to the furnace.

The actuating-fluid can be blast-air, steam, air, or water.

I do not confine myself to the construction and to the combination and arrangement of parts herein shown and described; but

I claim as my invention—

A charging-bell closing the mouth of a blast-furnace, combined with a cylinder and piston, and a connection between said piston and bell, for operating the latter by the agency of steam, air, or water, substantially as specified.

In testimony whereof I hereunto sign my name in presence of two subcribing witnesses.

JAMES THOMAS.

Witnesses:
J. H. FRAUNCES,
JOHN VEITCH.